US012601411B2

(12) United States Patent
Lee

(10) Patent No.: US 12,601,411 B2
(45) Date of Patent: Apr. 14, 2026

(54) POWDER PROTECTING THREE-WAY VALVE WITH CYLINDRICAL HEATING ELEMENT

(71) Applicant: AOTECH CO., LTD., Hwaseong-si (KR)

(72) Inventor: Seung Yong Lee, Hwaseong-si (KR)

(73) Assignee: AOTECH CO., LTD., Hwaseong-si (KR)

( * ) Notice: Subject to any disclaimer, the term of this patent is extended or adjusted under 35 U.S.C. 154(b) by 0 days.

(21) Appl. No.: 18/722,948

(22) PCT Filed: Mar. 8, 2024

(86) PCT No.: PCT/KR2024/003003
§ 371 (c)(1),
(2) Date: Jun. 21, 2024

(87) PCT Pub. No.: WO2024/186160
PCT Pub. Date: Sep. 12, 2024

(65) Prior Publication Data
US 2025/0067354 A1      Feb. 27, 2025

(30) Foreign Application Priority Data
Mar. 9, 2023      (KR) ........................ 10-2023-0031012

(51) Int. Cl.
*F16K 11/087* (2006.01)
*F16K 27/06* (2006.01)
*F16K 49/00* (2006.01)

(52) U.S. Cl.
CPC ........ *F16K 11/0873* (2013.01); *F16K 27/067* (2013.01); *F16K 49/002* (2013.01)

(58) Field of Classification Search
CPC .. F16K 11/0873; F16K 49/002; F16K 27/067; H01L 21/67017
See application file for complete search history.

(56) References Cited

U.S. PATENT DOCUMENTS 2,661,926 A * 12/1953 Resek ................. F16K 11/0876
251/174
3,100,499 A * 8/1963 Bass ..................... F16K 5/0668
137/246.22
(Continued)

FOREIGN PATENT DOCUMENTS

CN          110285260 A * 9/2019 ........... F16K 27/067
CN          110594485 A * 12/2019 .............. F16K 5/06
(Continued)

OTHER PUBLICATIONS

Korean Office Action for related KR Application No. 10-2023-0031012 mailed Sep. 14, 2023 from Korean Intellectual Property Office.

(Continued)

*Primary Examiner* — David Colon-Morales
(74) *Attorney, Agent, or Firm* — Paratus Law Group, PLLC

(57) ABSTRACT

A powder protecting three-way valve installed in a line of a semiconductor or flat panel display manufacturing apparatus to control flow of reaction by-product gas, includes: a valve casing comprising an inlet pipe through which the reaction by-product gas flows in and a plurality of outlet pipes through which the inflowing reaction by-product gas flows out in different directions; a rotating ball which is rotatably installed inside the valve casing and comprises an inlet hole communicating with the inlet pipe of the valve casing and outlet holes selectively communicating with the plurality of outlet pipes of the valve casing to control a direction of the flow of the reaction by-product gas; and a heating element installed in the valve casing to heat the inside of the valve casing.

9 Claims, 6 Drawing Sheets

(56) References Cited

U.S. PATENT DOCUMENTS

| 3,345,032 | A | * | 10/1967 | Rawstron | ............ | F16K 11/0876 |
| | | | | | | 251/315.1 |
| 3,605,789 | A | * | 9/1971 | Graham | .................. | F16K 5/205 |
| | | | | | | 137/240 |
| 4,685,488 | A | * | 8/1987 | Corbin | ................... | F16K 5/201 |
| | | | | | | 137/328 |
| 4,749,002 | A | * | 6/1988 | Lembser | ................. | F16K 25/02 |
| | | | | | | 251/315.1 |
| 5,842,683 | A | * | 12/1998 | Wei | ....................... | F16K 27/067 |
| | | | | | | 137/240 |
| 5,988,220 | A | * | 11/1999 | Sakaki | ............... | F16K 11/0876 |
| | | | | | | 137/625.22 |
| 6,578,598 | B2 | * | 6/2003 | Gardner | ............... | F16K 27/067 |
| | | | | | | 251/315.1 |
| 7,363,935 | B2 | * | 4/2008 | Anderson | ........... | F16K 11/0876 |
| | | | | | | 137/271 |
| 8,051,870 | B2 | * | 11/2011 | Matsuura | ................ | F16K 51/02 |
| | | | | | | 137/15.04 |
| 10,400,900 | B2 | * | 9/2019 | Kindersley | ........... | F16K 5/0689 |
| 11,322,369 | B2 | * | 5/2022 | Lee | ................... | H01L 21/67017 |
| 2009/0114296 | A1 | * | 5/2009 | Tsuda | ................... | F16K 11/207 |
| | | | | | | 251/304 |
| 2011/0220023 | A1 | * | 9/2011 | Lee | ....................... | F16L 23/006 |
| | | | | | | 118/715 |
| 2015/0114487 | A1 | * | 4/2015 | Schneider | ................. | F16K 5/06 |
| | | | | | | 137/341 |
| 2019/0368633 | A1 | * | 12/2019 | Sandiford | ............. | F16K 5/0663 |

FOREIGN PATENT DOCUMENTS

| CN | 115574124 | A | * | 1/2023 | ............ | F16K 11/087 |
| KR | 200405538 | Y1 | * | 1/2006 | ........... | F16K 27/067 |
| KR | 10-1508220 | B1 | | 4/2015 | | |
| KR | 20-2017-0003539 | U | | 10/2017 | | |
| KR | 10-1828427 | B1 | | 3/2018 | | |
| KR | 101835394 | B1 | * | 3/2018 | ........... | F16K 27/067 |
| KR | 101888819 | B1 | * | 8/2018 | ........... | F16K 49/002 |
| KR | 102027150 | B1 | * | 10/2019 | ....... | H01L 21/67098 |
| KR | 102073821 | B1 | * | 2/2020 | ........... | F16K 11/087 |

OTHER PUBLICATIONS

Korean Notice of Allowance for related KR Application No. 10-2023-0031012 mailed Nov. 2, 2023 from Korean Intellectual Property Office.

* cited by examiner

*-Prior Art-*

-Prior Art-

POWDER PROTECTING THREE-WAY VALVE WITH CYLINDRICAL HEATING ELEMENT

CROSS-REFERENCE TO PRIOR APPLICATIONS

This Application is a National Stage Patent Application of PCT International Application No. PCT/KR2024/003003 (filed on Mar. 8, 2024), which claims priority to Korean Patent Application No. 10-2023-0031012 (filed on Mar. 9, 2023), which are all hereby incorporated by reference in their entirety.

BACKGROUND

The present disclosure relates to a semiconductor or flat panel display manufacturing apparatus, and in particular, to a powder protecting three-way valve capable of effectively suppressing deposition and penetration of powder over a wide area in an exhaust line of semiconductor and flat panel display manufacturing equipment including inlet and outlet pipes and around a rotating ball installed therein.

Generally, a semiconductor and flat panel display manufacturing process largely consists of a pre-process (fabrication process) and a post-process (assembly process), and the pre-process refers to a process of manufacturing semiconductor chips by depositing a thin film on a wafer in various process chambers and repeatedly performing a process of selectively etching the deposited thin film to process a specific pattern, and the post-process refers to a process of separating the chips manufactured in the pre-process individually and then assembling the chip into a finished product by combining it with a lead frame.

At this time, the process of depositing the thin film on the wafer or etching the thin film deposited on the wafer is carried out at a high temperature using harmful gases such as silane, arsine, and boron chloride and process gases such as hydrogen in the process chamber, and a large amount of reaction by-product gas containing various ignitable gases, corrosive foreign substances, and toxic components is generated inside the process chamber while the above process is in progress.

In a semiconductor and flat panel display production line as described above, a vacuum pump and a scrubber, which is a gas processing device, are used to proceed with the process, and a line connecting the vacuum pump and the scrubber is called the exhaust line. In order to control the direction of the reaction by-product gas in this exhaust line and to use the scrubber efficiently, a three-way valve shown in FIGS. 1 and 2 is widely used.

The three-way valve is provided with a casing 10 having an inlet pipe 13 through which the reaction by-product gas flows in and a plurality of outlet pipes 11 and 12 through which the reaction by-product gas flows out, and a rotating ball 20 configured to rotate according to rotation of a rotation shaft 25 inside the casing 10 to control flow of the reaction by-product gas.

However, in the case of the 3-way valve used in the exhaust line where a lot of powder was generated, when used for a certain period of time, the reaction by-product gas or the powder contained in the reaction by-product gas or penetrated into a gap A1 between a ball seat 14 supporting the rotating ball 20 and the rotating ball 20, and then accumulated, making it difficult for the rotating ball 20 to operate. In particular, since an inlet hole side of the rotating ball 20 is directed toward the inlet pipe 13 of the valve casing 10, there was a strong tendency for the reaction by-product gas to penetrate into the gap between the rotating ball 20 and the ball seat 14 and solidify into powder.

In addition, there was a problem that the powder was deposited over substantially the entire area where the reaction by-product gas flowed, including the gap between the rotating ball 20 and the ball seat 14 and the inlet pipe 13 and outlet pipes 11 and 12 of the valve casing 10, as well as around the rotating ball 20 installed therein, so measures had to be prepared to deal with this problem, but there was no suitable solution.

SUMMARY

Accordingly, the present disclosure is proposed to solve various problems of the related art as described above, and an object of the present disclosure is to provide a powder protecting three-way valve which is capable of effectively suppressing deposition and penetration of powder over a wide area in the exhaust line of the semiconductor and flat panel display manufacturing equipment including the inlet and outlet pipes and around the rotating ball installed therein.

In order to achieve the object as described above, a powder protecting three-way valve according to the technical idea of the present disclosure is a powder protecting three-way valve installed in a line of a semiconductor or flat panel display manufacturing apparatus to control flow of reaction by-product gas including: a valve casing including an inlet pipe through which the reaction by-product gas flows in and a plurality of outlet pipes through which the inflowing reaction by-product gas flows out in different directions; a rotating ball which is rotatably installed inside the valve casing and includes an inlet hole communicating with the inlet pipe of the valve casing and outlet holes selectively communicating with the plurality of outlet pipes of the valve casing to control a direction of the flow of the reaction by-product gas; and a heating element installed in the valve casing to heat the inside of the valve casing, wherein the heating element is provided as a cylindrical heating element, and a plurality of the heating elements are installed on one side of the valve casing to be deeply inserted from vicinity of each corner toward the other side and disposed at a plurality of points around the rotating ball to heat the inside of the valve casing.

Here, a circular and elongated storage pocket in which the cylindrical heating element is stored may be formed near each corner on one side of the valve casing such that the cylindrical heating element is installed to be detachable.

In addition, the storage pocket may be formed in a direction perpendicular to the inlet pipe of the valve casing and may pass through upper and lower sides near the inlet pipe, and may pass through upper and lower sides near the outlet pipe provided in a straight line with the inlet pipe of the plurality of outlet pipes.

In addition, the valve casing may include a nozzle forming member installed to surround an outer peripheral surface of a rear end of the inlet pipe, and on an inner peripheral surface of the nozzle forming member, a chamber forming groove may be formed between the inner peripheral surface and an outer peripheral surface of the inlet pipe to form an annular nitrogen gas chamber to be filled with nitrogen gas supplied from outside, and a nozzle forming groove forming an annular injection nozzle may be formed in a gap narrower than the nitrogen gas chamber between the inner peripheral surface and the outer peripheral surface of the inlet pipe such that nitrogen gas is injected from the chamber forming groove toward the inside of the inlet hole of the rotating ball along the outer peripheral surface of the rear end of the inlet pipe, so that the nitrogen gas injected from the injection nozzle forms a tubular air curtain and blocks the reaction by-product gas from penetrating into a gap between a peripheral portion of the inlet hole of the rotating ball and a ball seat.

In addition, a nitrogen gas transfer hose which transfers the nitrogen gas to be supplied to the chamber forming groove of the valve casing from the outside may be connected to one storage pocket of the storage pockets so that the nitrogen gas supplied from the outside is heated by contacting an outer peripheral surface of the cylindrical heating element while passing via the one storage pocket.

In addition, a nitrogen gas inlet hole and a nitrogen gas transfer hole may be formed inside the valve casing, wherein one end of the nitrogen gas inlet hole is connected to the nitrogen gas transfer hose through a connecting end and the other end communicates with a front end near an entrance of the one storage pocket in a crossing fashion, and the nitrogen gas transfer hole is formed by connecting a rear end of the one storage pocket and the nitrogen gas chamber to transfer nitrogen heated by the cylindrical heating element in the one storage pocket to the nitrogen gas chamber.

In addition, a wire may be installed spirally along the outer peripheral surface of the cylindrical heating element stored in the one storage pocket and the nitrogen gas passing via the one storage pocket moves spirally along the spiral wire, increasing contact time with the cylindrical heating element.

In addition, the nozzle forming member may be equipped with a temperature sensor so that temperature may be measured for the nitrogen gas immediately after passing via the storage pocket.

In addition, the storage pocket of the cylindrical heating element may be formed in a direction perpendicular to the inlet pipe of the valve casing and passes through upper and lower sides near the inlet pipe, and may pass through upper and lower sides near the outlet pipe provided in a straight line with the inlet pipe of the plurality of outlet pipes, and the one storage pocket via which the nitrogen gas passes may be formed to pass through the upper side near the inlet pipe.

In addition, the powder protecting three-way valve may further include a plurality of pocket covers which are bolted to one side of the valve casing, each of the plurality of pocket covers covering an entrance of the storage pocket one by one to prevent the cylindrical heating element stored in the storage pocket from being separated and being provided with a wire extraction hole which allows extraction of an electric wire of the cylindrical heating element.

In addition, the valve casing may further include a side cover member which covers the entire one side of the valve casing and conceals the pocket cover inside.

A powder protecting three-way valve according to the present disclosure is capable of effectively suppressing the deposition and penetration of powder from the reaction by-product gas by effectively heating a wide area from the rotating ball to the inlet pipe and outlet pipes by the cylindrical heating elements arranged around the rotating ball to surround it.

Further, according to the present disclosure, it is possible to effectively suppress the chronic problem of powder deposition due to the reaction by-product gas penetrating into the gap between a peripheral portion of the inlet hole of the rotating ball and the ball seat by forming a tubular air curtain by high-temperature nitrogen gas injected along an outer peripheral surface of a rear end of the inlet pipe.

Furthermore, the present disclosure has an advantage in terms of maintenance that the cylindrical heating element can be simply inserted and installed by forming the storage pocket in the valve casing, and when necessary, the cylindrical heating element can be easily removed and separated from the storage pocket.

In addition, the present disclosure is configured so that nitrogen gas supplied from the outside is injected after passing through the storage pocket in which the cylindrical heating element is stored, and thus does not require separate equipment for externally heating nitrogen gas or equipment for insulating high-temperature nitrogen gas while transporting it.

EXPLANATION OF SYMBOLS

Figure 1:
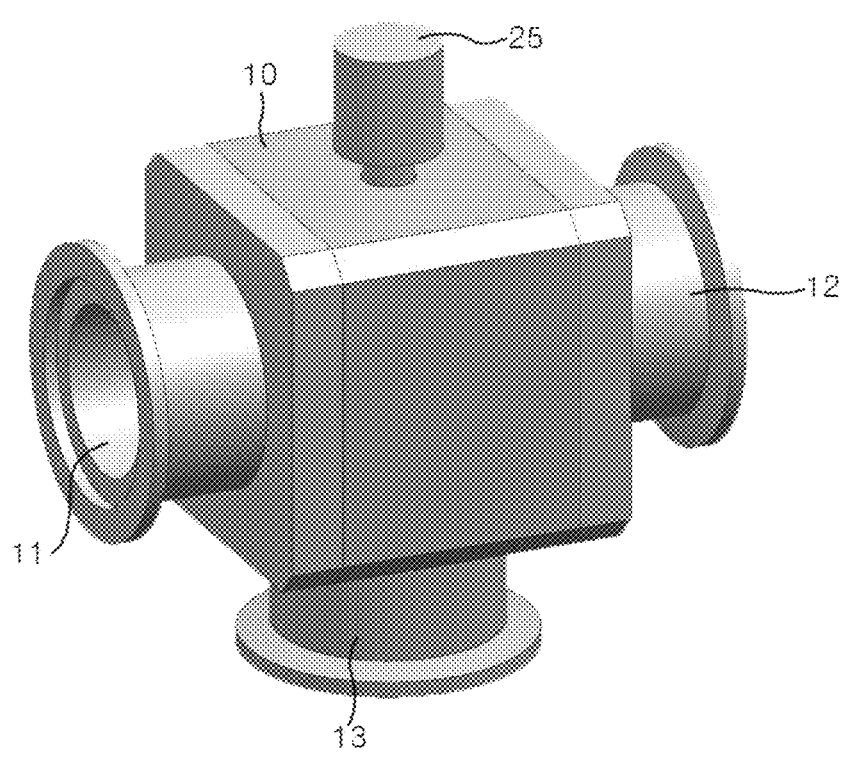
FIGS. 1 and 2 are reference diagrams for illustrating a three-way valve according to a related-art.
Figure 2:
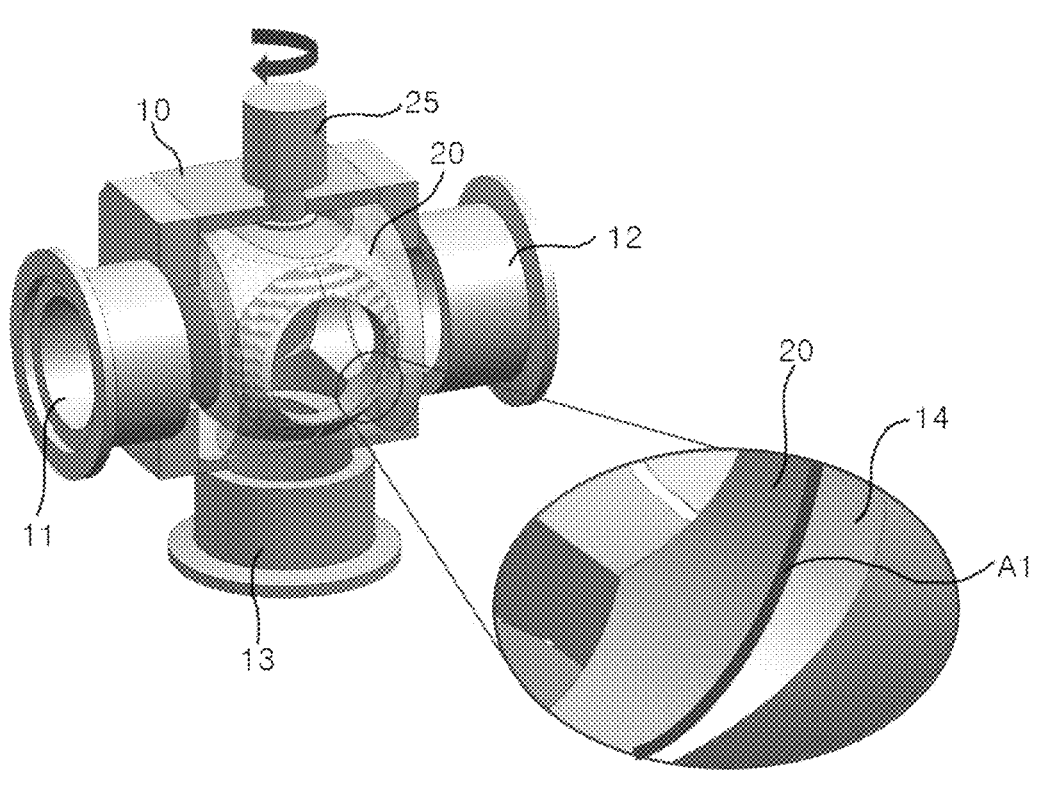

110: Valve casing 113: Storage pocket
116: Nozzle forming member 120: Cylindrical heating element
125: Spiral wire 130: Actuator
140: Temperature sensor 150: Rotating ball

DETAILED DESCRIPTION

With reference to the accompanying drawings, a powder protecting three-way valve according to embodiments of the present disclosure will be described in detail. Since the present disclosure may be modified in various ways and may have various forms, it is intended to illustrate particular embodiments in the drawings and describe them in detail in the detailed description. However, this is not intended to limit the present invention to a particular form of disclosure and should be understood to include all changes, equivalents, and replacements within the idea and the technical scope of the present disclosure. When describing each drawing, like reference numerals are used for like components. In the accompanying drawings, the dimensions of structures are enlarged than they actually are for clarity of the present disclosure, or are shown smaller than they actually are in order to understand the schematic configuration.

In addition, although terms such as first and second may be used to explain various components, the components should not be limited by such terms. These terms are used only to distinguish one component from another component. For example, a first component may be referred to as a second component, or similarly, the second component may be referred to as the first component without departing from the scope of the present disclosure. On the other hand, unless otherwise defined, all terms used herein including technical or scientific terms have the same meanings as those generally understood by those skilled in the art to which the present disclosure pertains. Terms defined in dictionaries generally used should be construed to have meanings matching contextual meanings in the related art and are not to be construed as an ideal or excessively formal meaning unless explicitly defined herein.

EMBODIMENTS

Figure 3:
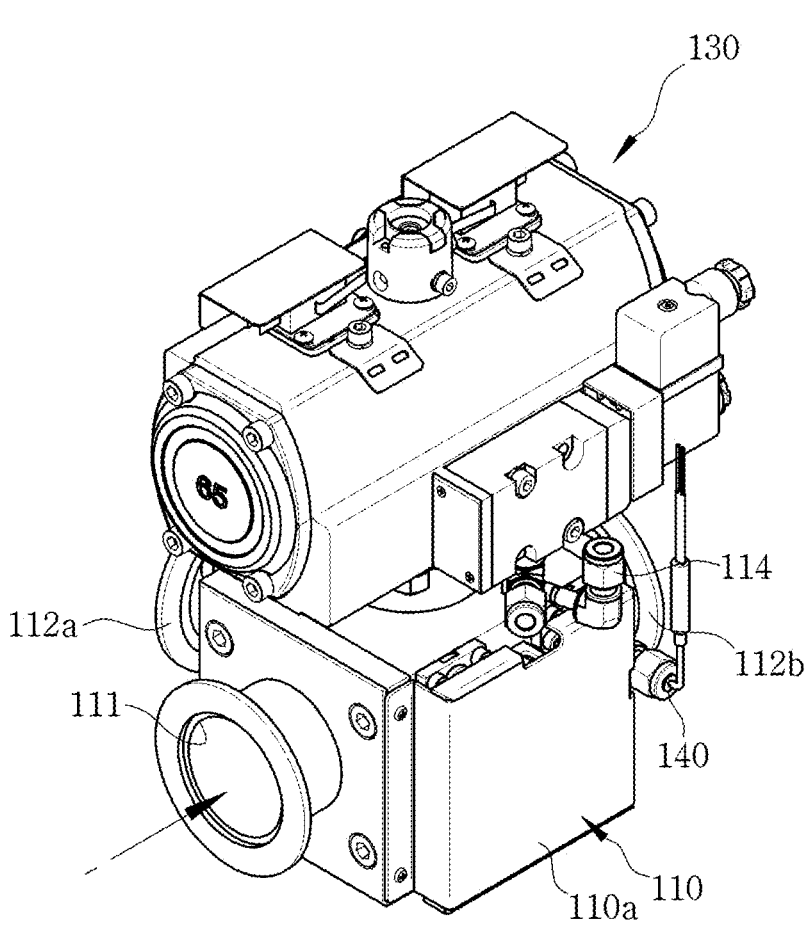
FIG. 3 is a perspective view of a powder protecting three-way valve according to an embodiment of the present disclosure.
Figure 4:
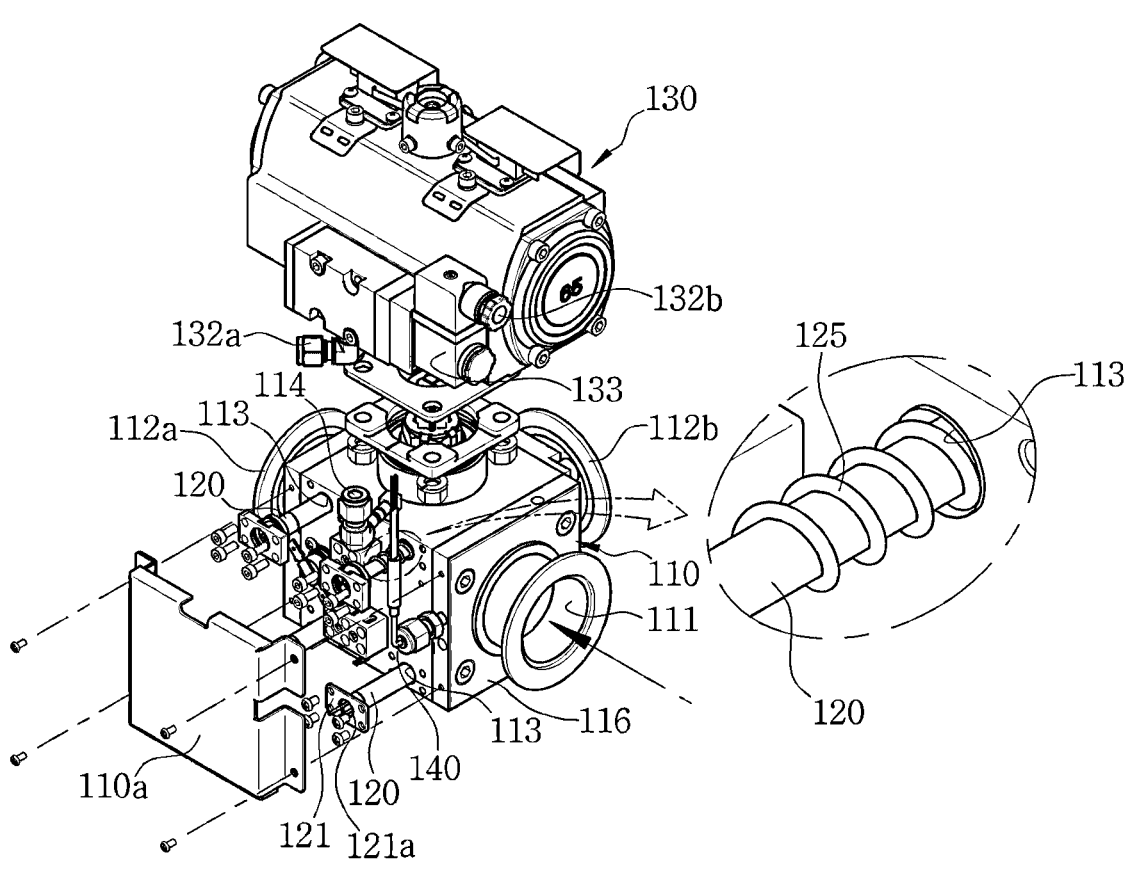
FIG. 4 is an exploded perspective view of a powder protecting three-way valve according to an embodiment of the present disclosure.
Figure 5:
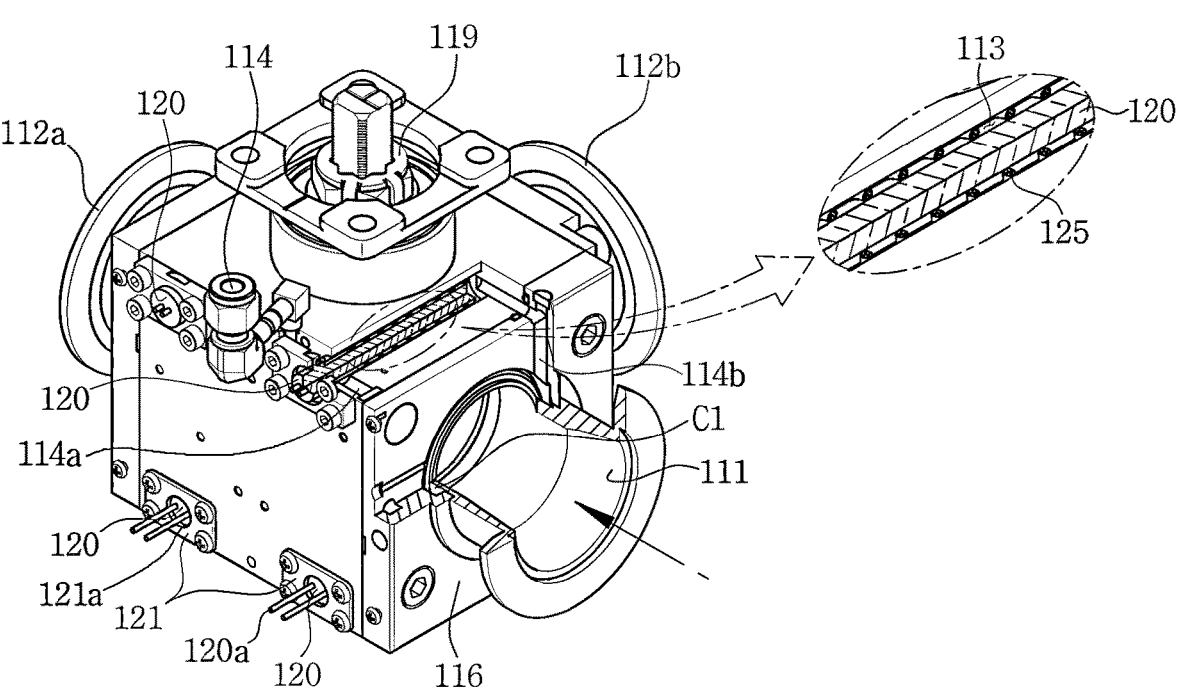
FIG. 5 is a partial cross-sectional view for illustrating a nitrogen gas flow path structure formed in a valve casing in a powder protecting three-way valve according to an embodiment of the present disclosure.
Figure 6:
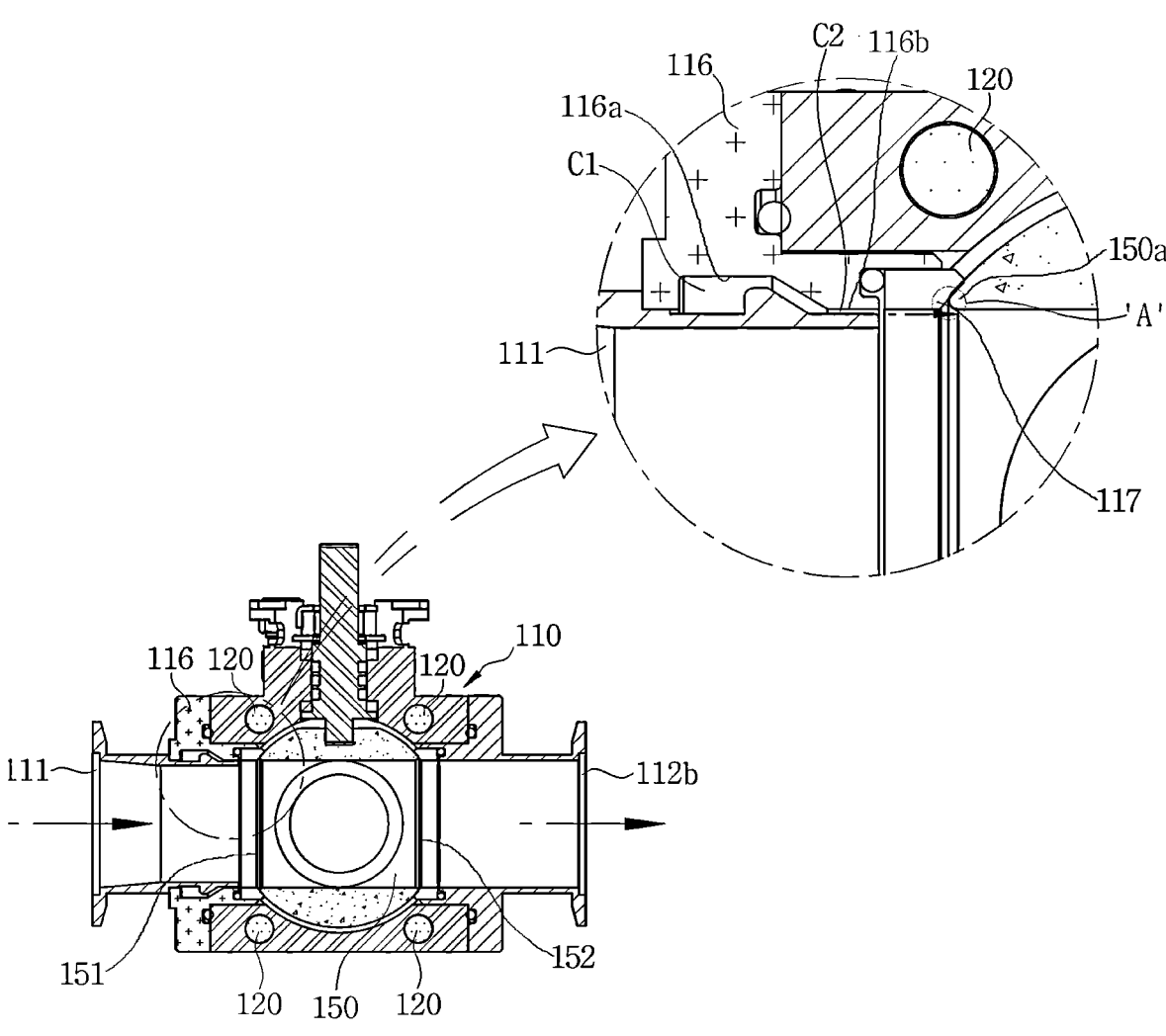
FIG. 6 is a longitudinal cross-sectional view for illustrating an injection structure of nitrogen gas in a powder protecting three-way valve according to an embodiment of the present disclosure.

FIG. 3 is a perspective view of a powder protecting three-way valve according to an embodiment of the present disclosure, FIG. 4 is an exploded perspective view of the powder protecting three-way valve according to an embodiment of the present disclosure, FIG. 5 is a partial cross-sectional view for illustrating a nitrogen gas flow path structure formed in a valve casing in the powder protecting three-way valve according to an embodiment of the present disclosure, and FIG. 6 is a longitudinal cross-sectional view for illustrating an injection structure of nitrogen gas in the powder protecting three-way valve according to an embodiment of the present disclosure.

As shown, the powder protecting three-way valve by an embodiment of the present disclosure includes a valve casing 110, a rotating ball 150, and an actuator 130, and in addition, further includes a plurality of cylindrical heating elements 120 and a temperature sensor 140 arranged surrounding the rotating ball 150 as main components.

The present disclosure has a configuration in which the plurality of cylindrical heating elements 120 are arranged to surround the rotating ball 150 as described above to heat a wide area, including the inlet pipe 111, the outlet pipes 112a and 112b, and around the rotating ball 150, thereby effectively suppressing deposition of powder generated from reaction by-product gas, and high-temperature nitrogen gas is injected along an outer peripheral surface of a rear end of the inlet pipe 111 to form a tubular air curtain while effectively blocking the problem of penetration of the reaction by-product gas and powder deposition between the rotating ball 150 and a ball seat 117 of the valve casing 110.

Hereinafter, focusing on each of the components above, the powder protecting three-way valve by an embodiment of the present disclosure will be described in detail.

The valve casing 110 has an internal space to accommodate the rotating ball 150 and includes, centered on the internal space, the inlet pipe 111 through which the reaction by-product gas flows in and the plurality of outlet pipes 112a and 112b through which the reaction by-product gas flowing in through the inlet pipe flows out in different directions. Further, each of a front end of the inlet pipe 111 and rear ends of the outlet pipes 112a and 112b is provided with a flange for connection with other pipes. Here, inside walls of the valve casing 110, ball seats 117 are provided near the rear end of the inlet pipe 111 and near front ends of the outlet pipes 112a and 112b, respectively, to rotatably support the rotating balls 150.

On one side that is not provided with the inlet pipe 111 and the outlet pipes 112a and 112b among the sides of the valve casing 110, a plurality of storage pockets 113 for storing the cylindrical heating elements 120 are each formed in a circular and elongated shape. The storage pocket 113 is formed to extend to the vicinity of the other side of the valve casing 110. Thus, the cylindrical heating element 120 is simply installed to be stored in the storage pocket 113, and may be simply taken out and separated from the storage pocket 113 if necessary for inspection or replacement of the heating element 120. As shown in FIGS. 4 and 5, the storage pocket 113 is formed near each corner on one side of the valve casing, and is formed in a direction perpendicular to the inlet pipe 111 of the valve casing 110 and passes through upper and lower sides near the inlet pipe 111, and passes through upper and lower sides near the outlet pipe 112a provided in a straight line with the inlet pipe 111 of the plurality of outlet pipes 112a and 112b.

The valve casing 110 includes a nozzle forming member 116 installed to surround the outer peripheral surface of the rear end of the inlet pipe 111. On an inner peripheral surface of the nozzle forming member 116, a chamber forming groove 116a is formed between the inner peripheral surface and an outer peripheral surface of the inlet pipe 111 to form an annular nitrogen gas chamber C1 to be filled with nitrogen gas supplied from the outside, and a nozzle forming groove 116b forming an annular injection nozzle C2 is formed in a gap narrower than the nitrogen gas chamber C1 between the inner peripheral surface and the outer peripheral surface of the inlet pipe 111 so that nitrogen gas may be injected from the chamber forming groove 116a into an inlet hole 151 of the rotating ball 150 in a direction consistent with the flow direction of the reaction by-product gas along the outer peripheral surface of the rear end of the inlet pipe 111. As a result, when the nitrogen gas moves to the injection nozzle C2, which has a narrower cross-section than the nitrogen gas chamber C1, and is injected, it may be sprayed more strongly due to an eject effect, and as shown in the enlarged part of FIG. 6, the nitrogen gas injected from the injection nozzle C2 forms a tubular air curtain along the outer peripheral surface of the inlet pipe 111 and it is possible to effectively block the reaction by-product gas from penetrating into a gap A between the ball seat 117 and a peripheral portion 150a of the inlet hole 151 of the rotating ball 150. Accordingly, it is possible to solve a critical problem of high driving load on the rotating ball 150 as the reaction by-product gas penetrates into the gap A between the peripheral portion 150a of the inlet hole 151 of the rotating ball 150 and the ball seat 117 and the powder is deposited. Further, due to the high-temperature nitrogen gas which is strongly injected in the direction of the flow of the reaction by-product gas through the injection nozzle C2, the flow of the reaction by-product gas passing through the powder protecting three-way valve is also improved.

Furthermore, a nitrogen gas transfer hose to transfer external nitrogen gas is connected to one storage pocket 113 located on the upper side of the inlet pipe 111 among the plurality of storage pockets 113, and the nitrogen gas supplied from the outside passes via the one storage pocket 113 and is heated by contacting an outer peripheral surface of the cylindrical heating element 120 installed therein, and then injected at a high temperature from the injection nozzle C2. According to this configuration, the protecting three-way valve itself has a nitrogen gas heating function, so there is no need to have a separate facility for heating nitrogen gas from the outside and a facility for insulation.

In order to maximize an heating effect of the nitrogen gas as described above, a wire 125 is installed spirally along the outer peripheral surface of the cylindrical heating element 120 stored in the one storage pocket 113 as shown in FIGS. 4 and 5. As a result, the nitrogen gas passing via the one storage pocket 113 moves spirally along the spiral wire 125, increasing contact time with the cylindrical heating element 120 and is heated more effectively.

Here, to transfer from the nitrogen gas transfer hose to the annular nitrogen gas chamber C1, a nitrogen gas inlet hole 114a and a nitrogen gas transfer hole 114b are formed inside the valve casing 110 as shown in FIG. 5. One end of the nitrogen gas inlet hole 114a is connected to the nitrogen gas transfer hose through a connecting end 114, and the other end communicates with a front end near an entrance of the one storage pocket 113 in a crossing fashion. The nitrogen gas transfer hole 114b is formed by connecting a rear end of the one storage pocket 113 and the nitrogen gas chamber C1 to transfer nitrogen heated by the cylindrical heating element 120 in the one storage pocket 113 to the annular nitrogen gas chamber C1.

The nozzle forming member 116 is equipped with the temperature sensor 140 so that temperature can be measured for nitrogen gas immediately after passing via the storage pocket 113. This makes it possible to measure the temperature of the high-temperature nitrogen gas injected inside the powder protecting three-way valve to suppress powder formation, and based on this, temperature of the cylindrical heating element 120 may be controlled to an appropriate level.

On one side of the valve casing 110, a plurality of pocket covers 121 are further installed to prevent the cylindrical heating elements 120 stored in the storage pockets 113 from being removed. The pocket cover 121 is provided with an electric wire extraction hole 121a in a flat panel so that an electric wire 120a of the cylindrical heating element 120 can be extracted and is installed to cover the entrance of the storage pocket 113 one by one by fastening with bolts. In addition, as shown in FIG. 4, a side cover member 110a that covers the entire one side of the valve casing 110 and conceals the pocket cover 121 inside is further included. This allows major components such as the plurality of storage pockets 113 provided on one side of the valve casing 110, the plurality of cylindrical heating elements 120 stored in the storage pockets 113, and the pocket cover 121 to be completely concealed and protected.

The rotating ball 150 is installed to be rotatable in the internal space of the valve casing 110 and plays a role in controlling the flow direction of the reaction by-product gas. For this purpose, the rotating ball 150 is provided with one inlet hole 151 which is always maintained in communication with the inlet pipe 111 of the valve casing 110, and a plurality of outlet holes 152 which correspond to the plurality of outlet pipes 112a and 112b provided in the valve casing 110 and selectively communicate with one of the plurality of outlet pipes 112a and 112b according to the direction of rotation. Thus, the rotating ball 150 is connected to a rotation shaft 119 of the actuator 130 and rotates and selectively blocks and opens any one of the plurality of outlet pipes 112a and 112b formed in the valve casing 110 according to a rotation angle to control the flow direction of the reaction by-product gas. Since this rotating ball 150 is very similar to the known prior art, detailed description thereof will be omitted. However, in the case of the rotating ball 150 included in the powder protecting three-way valve according to the embodiment of the present disclosure, there is almost no problem with the rotating ball being damaged or inoperable as the reaction by-product gas and powder solidified therefrom penetrate and accumulate between the ball seat 117 of the valve casing 110 and the rotating ball 150, the rotating ball is damaged or becomes inoperable. This is because the high-temperature nitrogen gas flowing into the inside of the valve casing 110 and injecting through the injection nozzle C2 forms a tubular air curtain and effectively blocks the penetration of the reaction by-product gas into the gap A between the peripheral portion of the inlet hole 151 of the rotating ball 150 and the ball seat 117.

The cylindrical heating element 120 is stored and installed in the storage pocket 113 of the valve casing 110 and serves to heat the rotating ball 150 and the inside of the valve casing 110. Since the plurality of cylindrical heating elements 120 stored in the storage pocket 113 are installed on one side of the valve casing 110 to be deeply inserted from the vicinity of each corner toward the other side as shown, the plurality of cylindrical heating elements 120 may heat the inside of the valve casing 110 while being disposed at a plurality of points surrounding the rotating ball 150. As a result, first, the rotating ball 150 may be three-dimensionally heated from all directions and a wide area may be heated, including the inlet pipe 111 and the outlet pipes 112a and 112b, effectively suppressing the deposition and penetration of the powder generated from the reaction by-product gas.

In the case of the cylindrical heating element 120, it is possible to heat the rotating ball 150 and the valve casing 110 almost entirely as described above, and the cylindrical heating element 120 has a great advantage in that it can be installed simply by storing it in the storage pocket 113, and can be simply removed by taking it out of the storage pocket 113 if necessary for inspection or replacement.

The actuator 130 is connected to the rotating ball 150 by the rotation shaft 119 to provide a driving force to rotate the rotating ball 150. The actuator 130 may be a pneumatic actuator 130 to generate a driving force to rotate the rotating ball 150 by pneumatic pressure. For this purpose, the actuator 130 is provided with an air inlet 132a through which driving air flows in and an air outlet 132b through which air is discharged after passing through the inside of the actuator 130, and a solenoid valve 133 is installed in the middle of the actuator 130 to control the flow rate of the driving air.

While the preferred embodiments of the present invention have been described above, the present invention may use various changes, modifications, and equivalents. It is clear that the present disclosure can be equally applied by appropriately modifying the above embodiments. Therefore, the above description does not limit the scope of the present disclosure, which is defined by the limitations of the appended claims.

The invention claimed is:

1. A powder protecting three-way valve installed in a line of a semiconductor or flat panel display manufacturing apparatus to control flow of reaction by-product gas, the powder protecting three-way valve comprising:

a valve casing comprising an inlet pipe through which the reaction by-product gas flows in and a plurality of outlet pipes through which the inflowing reaction by-product gas flows out in different directions;

a rotating ball which is rotatably installed inside the valve casing and comprises an inlet hole communicating with the inlet pipe of the valve casing and outlet holes selectively communicating with the plurality of outlet pipes of the valve casing to control a direction of the flow of the reaction by-product gas; and a heating unit installed in the valve casing and configured to heat an inside of the valve casing, wherein the heating unit comprises a plurality of cylindrical heaters respectively accommodated in corresponding circular and elongated storage pockets formed near corner regions on one side of the valve casing, each storage pocket being formed in a direction perpendicular to the inlet pipe and passing through upper and lower side portions near the inlet pipe and upper and lower side portions near an outlet pipe disposed in line with the inlet pipe among the plurality of outlet pipes, and each cylindrical heater being detachably inserted into corresponding storage pocket and disposed at multiple circumferential positions around the rotating ball to heat the inside of the valve casing.

2. The powder protecting three-way valve of claim 1, wherein the valve casing comprises a nozzle forming member installed to surround an outer peripheral surface of a rear end of the inlet pipe, and on an inner peripheral surface of the nozzle forming member, a chamber forming groove is formed between the inner peripheral surface and an outer peripheral surface of the inlet pipe to form an annular nitrogen gas chamber to be filled with nitrogen gas supplied from outside, and a nozzle forming groove forming an annular injection nozzle is formed in a gap narrower than the nitrogen gas chamber between the inner peripheral surface and the outer peripheral surface of the inlet pipe such that the nitrogen gas is injected from the chamber forming groove toward the inside of the inlet hole of the rotating ball along the outer peripheral surface of the rear end of the inlet pipe, so that the nitrogen gas injected from the injection nozzle forms a tubular air curtain and blocks the reaction by-product gas from penetrating into a gap between a peripheral portion of the inlet hole of the rotating ball and a ball seat.

3. The powder protecting three-way valve of claim 2, wherein a nitrogen gas transfer hose which transfers the nitrogen gas to be supplied to the chamber forming groove of the valve casing from the outside is connected to one storage pocket of the storage pockets so that the nitrogen gas supplied from the outside is heated by contacting an outer peripheral surface of one of the cylindrical heaters while passing via the one storage pocket.

4. The powder protecting three-way valve of claim 3, wherein a nitrogen gas inlet hole and a nitrogen gas transfer hole are formed inside the valve casing, wherein one end of the nitrogen gas inlet hole is connected to the nitrogen gas transfer hose through a connecting end and the other end communicates with a front end near an entrance of the one storage pocket in a crossing fashion, and the nitrogen gas transfer hole is formed by connecting a rear end of the one storage pocket and the nitrogen gas chamber to transfer the nitrogen heated by the cylindrical heater in the one storage pocket to the nitrogen gas chamber.

5. The powder protecting three-way valve of claim 3, wherein a wire is installed spirally along the outer peripheral surface of the cylindrical heater stored in the one storage pocket and the nitrogen gas passing via the one storage pocket moves spirally along the spiral wire, increasing contact time with the cylindrical heater.

6. The powder protecting three-way valve of claim 5, wherein the nozzle forming member is equipped with a temperature sensor so that temperature is measured for the nitrogen gas immediately after passing via the one storage pocket.

7. The powder protecting three-way valve of claim 5, wherein the one storage pocket via which the nitrogen gas passes is formed to pass through the upper side portion near the inlet pipe.

8. A powder protecting three-way valve installed in a line of a semiconductor or flat panel display manufacturing apparatus to control flow of reaction by-product gas, the powder protecting three-way valve comprising:

a valve casing comprising an inlet pipe through which the reaction by-product gas flows in and a plurality of outlet pipes through which the inflowing reaction by-product gas flows out in different directions;

a rotating ball which is rotatably installed inside the valve casing and comprises an inlet hole communicating with the inlet pipe of the valve casing and outlet holes selectively communicating with the plurality of outlet pipes of the valve casing to control a direction of the flow of the reaction by-product gas;

a heating unit installed in the valve casing and configured to heat an inside of the valve casing, wherein the heating unit comprises a plurality of cylindrical heaters respectively accommodated in corresponding circular and elongated storage pockets formed near corner regions on one side of the valve casing, and each cylindrical heater being detachably inserted into corresponding storage pocket and disposed at multiple circumferential positions around the rotating ball to heat the inside of the valve casing; and a plurality of pocket covers which are bolted to the one side of the valve casing, each of the plurality of pocket covers covering an entrance of each storage pocket to prevent each cylindrical heater stored in each storage pocket from being separated and being provided with a wire extraction hole which allows extraction of an electric wire wound on each cylindrical heater.

9. The powder protecting three-way valve of claim 8, wherein the valve casing further comprises a side cover member which covers the one side of the valve casing and conceals the plurality of pocket covers inside.

* * * * *